United States Patent
White

(10) Patent No.: US 9,890,825 B2
(45) Date of Patent: Feb. 13, 2018

(54) ROTOR PROTECTION SHIELD FOR HEAVY-DUTY VEHICLES

(71) Applicant: Hendrickson USA, L.L.C., Itasca, IL (US)

(72) Inventor: Jay D. White, Massillon, OH (US)

(73) Assignee: Hendrickson USA, LLC, Itasca, IL (US)

( * ) Notice: Subject to any disclaimer, the term of this patent is extended or adjusted under 35 U.S.C. 154(b) by 43 days.

(21) Appl. No.: 14/923,490

(22) Filed: Oct. 27, 2015

(65) Prior Publication Data

US 2017/0114843 A1    Apr. 27, 2017

(51) Int. Cl.
*F16D 65/00*    (2006.01)
*F16D 55/00*    (2006.01)

(52) U.S. Cl.
CPC .. *F16D 65/0081* (2013.01); *F16D 2055/0037* (2013.01)

(58) Field of Classification Search
CPC ...... F16D 51/00; F16D 55/00; F16D 65/0006; F16D 65/0025; F16D 65/0081; F16D 65/10; F16D 2051/005; F16D 2055/0037; F16D 2055/0062
USPC ...................................... 188/218 A
See application file for complete search history.

(56) References Cited

U.S. PATENT DOCUMENTS

| | | | |
|---|---|---|---|
| 4,197,926 A | | 4/1980 | Youngdale |
| 4,313,528 A | * | 2/1982 | Ito .......................... B60T 1/065 188/218 A |
| 4,360,083 A | * | 11/1982 | Weisman ................ B60T 1/065 188/18 A |
| 6,318,809 B1 | * | 11/2001 | Bennett ................. B60B 7/0046 188/218 A |
| D619,945 S | * | 7/2010 | Sadanowicz ................. D12/180 |
| D723,983 S | * | 3/2015 | Blanca ........................ D12/180 |

FOREIGN PATENT DOCUMENTS

| | | | |
|---|---|---|---|
| CN | 103335039 | * | 10/2013 |
| CN | 103335039 A | * | 10/2013 |
| EP | 1191245 A2 | | 3/2002 |
| JP | 2004353797 A | * | 12/2004 |
| JP | 2004353797 A | * | 12/2004 |

OTHER PUBLICATIONS

English machined translation of CN-103335039, Description only.*

(Continued)

*Primary Examiner* — Robert A. Siconolfi
*Assistant Examiner* — San M Aung
(74) *Attorney, Agent, or Firm* — Dureska & Moore LLC; David P. Dureska

(57) ABSTRACT

A rotor protection shield for a disc brake system for heavy-duty vehicles includes a flat, radially-extending central wall and a sidewall. The sidewall is integrally formed with and extends radially outwardly from an outer periphery of the central wall. The sidewall is angled axially outboardly relative to a planar surface of the central wall at an angle that is between about forty-five degrees and about seventy-five degrees. The central wall and the sidewall are smooth, and the shield is mounted to a torque plate proximate an inboard surface of the disc brake rotor to protect the rotor from road spray and contaminants.

19 Claims, 10 Drawing Sheets

(56) References Cited

OTHER PUBLICATIONS

Technical Procedure—MAXX22T Air Disc Brake, Hendrickson USA, L.L.C., T72009, Apr. 2015, p. 11,35.
Bendix Rotor Shield Photos 1-2, Bendix Rotor Shield , Mid-America Trucking Show, Louisville, KY, Mar. 21, 2013.
SAF Rotor Shield Photos 1-2, Mid-America Trucking Show, Louisville, KY, Mar. 21, 2013.
Unknown Rotor Shield Photos 1-2, Mid-America Trucking Show, Louisville, KY, Mar. 21, 2013.
Hendrickson Rotor Shield Photo, Mid-America Trucking Show, Louisville, KY, Mar. 21, 2013.

* cited by examiner

ROTOR PROTECTION SHIELD FOR HEAVY-DUTY VEHICLES

BACKGROUND OF THE INVENTION

Technical Field

The invention relates to the art of disc brakes for heavy-duty vehicles. More particularly, the invention relates to rotors of disc brakes for heavy-duty vehicles. Still more particularly, the invention is directed to a shield that protects a rotor of a disc brake. The shield includes a smooth radially-extending wall and a smooth axially-angled wall, which provide direct protection against road spray and reduce the buildup of contaminants, thereby reducing corrosion of the rotor and optimizing the performance and life of the rotor and corresponding brake pads.

Background Art

Disc brake systems for vehicles are well known in the brake art. Such systems operate by forcing a pair of opposing brake pads against a rotor, thereby creating friction between the pads and the rotor to enable slowing and/or stopping of the vehicle. More particularly, a disc brake system includes a plurality of disc brake assemblies, in which each assembly is operatively mounted on or adjacent a wheel end of the vehicle.

Each disc brake assembly includes a carrier, which supports a caliper that is described in greater detail below, and is attached to a torque plate, typically by mechanical fasteners, such as bolts. The torque plate in turn is rigidly connected to an axle of an axle/suspension system of the vehicle, such as by welding. The torque plate resists the torque that is generated during braking, and maintains proper alignment of the carrier and caliper to ensure optimum operation of the components of the brake assembly.

As mentioned above, the carrier supports a caliper, and the caliper is formed with a bore for receiving one or more pistons and an actuator. The actuator typically is a brake air chamber, which is in fluid communication with a compressed air source and activates movement of the piston(s). The caliper also includes an outboard pad seat that is disposed opposite the piston(s). Each one of a pair of opposing brake pads includes friction material that is mounted on a backing plate, and is seated in the carrier, with one of the pads being adjacent the piston(s) and the other pad being adjacent the outboard pad seat. Upon actuation by the actuator, the piston(s) and the outboard pad seat cooperate to control movement of the brake pads.

The rotor includes a disc portion, which is disposed between the brake pads in a manner that allows the friction material of each pad to face a respective one of a pair of surfaces of the disc portion. The rotor also includes a mounting portion that is adapted for mounting to a respective one of the wheel end assemblies of the vehicle by mechanical fasteners, such as bolts. A sleeve typically is integrally formed with and extends between the disc portion and the mounting portion of the rotor. This construction enables the rotor to be rigidly connected to the wheel end assembly, and thus to its respective vehicle wheel.

During vehicle travel, when the vehicle brake system is engaged, compressed air flows to the actuator, which engages movement of the piston(s) and the outboard pad seat, which in turn forces the friction material of the pads against the disc portion of the rotor, slowing and/or stopping rotation of the rotor, thereby slowing and/or stopping rotation of the vehicle wheel. It is known in the art that, during normal operation of a heavy-duty vehicle, certain contaminants and road conditions can cause the rotor to corrode, which reduces the performance and life of the brake rotor and the brake pads.

More particularly, when a heavy-duty vehicle travels over roads, abrasive contaminants such as dirt, sand, mud, snow, and the like contact the underside of the vehicle. For the purpose of convenience, such abrasive contaminants shall collectively be referred to as contaminants. Because the brake assemblies are located on the lower portion of the vehicle, contaminants tend to collect on certain components of the disc brake assembly, including the rotor and surfaces proximate the rotor. When contaminants collect and build up on the rotor and such surfaces, they may create a scouring effect on the rotor, which makes the rotor more susceptible to corrosion.

In addition, when a heavy-duty vehicle travels over roads and there is moisture on the road surface, road spray may be generated. Road spray is the moisture that is caused to move upward from the road surface by the vehicle tires toward the underside of the vehicle. In addition, cross splash may be generated, which is the splashing of moisture from puddles toward the underside of the vehicle when a vehicle tire contacts a puddle. By contacting the underside of the vehicle, road spray and cross splash contact many exposed components on the lower portion of the vehicle. Because the brake assemblies are located on the lower portion of the vehicle, when the vehicle travels over wet roads, road spray and cross splash tend to collect on certain components of the disc brake assembly, including the rotor. For the purpose of convenience, reference below shall be made to road spray with the understanding that such reference includes both road spray and cross splash.

It is known in the art that road spray may include salt or other chemicals that are present on the road surface. For example, salt from salt water is often present on roads near a sea, and roads in areas with abundant ice or snow are often treated with certain chemicals for anti-icing or de-icing. Anti-icing and de-icing shall collectively be referred to herein for the purpose of convenience as anti-icing. Such anti-icing chemicals include sodium chloride, calcium chloride, magnesium chloride, and mixtures thereof. In the past, sodium chloride, which is commonly referred to as road salt, had typically been used to treat roads for anti-icing. However, more aggressive anti-icing chemicals have been developed, including calcium chloride and magnesium chloride. Because road spray includes such salt or other chemicals, the road spray that collects on the rotor thus includes the salt and/or other chemicals. The collection of road spray that includes salt and/or anti-icing chemicals, and in particular the more aggressive anti-icing chemicals, can cause corrosion of the rotor. Such corrosion may be exacerbated by the above-described scouring effect of the rotor by contaminants. It is to be understood that reference herein to road spray includes the above-described anti-icing chemicals.

The inboard surface of the rotor disc, which shall be referred to herein for the purpose of convenience as the inboard surface of the rotor, is particularly exposed to road spray and contaminants, and thus is more susceptible to corrosion. When the inboard surface of the rotor corrodes, the corresponding brake pad wears prematurely from contact with the corroded surface, which reduces the performance and life of the rotor and at least the inboard brake pad. To reduce the amount of road spray and contaminants that contact the inboard surface of the rotor, shields have been employed in the prior art. Such shields typically are rigidly attached to the axle or the torque plate inboardly of the rotor, and thus are statically-mounted structures that attempt to prevent direct contact of road spray and contaminants with the inboard surface of the rotor.

One exemplary prior art shield includes a simple radially-extending wall that is bolted to the inboard surface of the torque plate. Rotor shields of this particular design extend radially from the outer surface of the axle to slightly past the outer periphery or edge of the rotor. Because the attachment location at the inboard surface of the torque plate is spaced about an inch or more from the rotor, and the shield is a single flat wall, road spray and contaminants may easily work around the shield and contact the inboard surface of the rotor. Therefore rotor shields of this design provide very limited protection from road spray and contaminants.

In other types of prior art rotor shields, the shield includes a radially-extending wall portion that is bolted to projections formed on the torque plate, and which typically are cast as part of the torque plate. The radially-extending wall portion of a rotor shield of this design typically extends radially past the outer periphery or edge of the rotor. The shield then bends at about a ninety-degree angle to form an axially-extending wall portion that extends outboardly over a portion of the outer periphery of the rotor disc. The radially-extending wall portion is formed with a plurality of spaced-apart features, including vent louvres and indentations, which are intended to allow road spray and contaminants to escape from the space between the inboard surface of the rotor and the shield. However, over time, the features often trap and hold contaminants, which in turn undesirably increases the exposure of the inboard surface of the rotor to road spray and contaminants.

Still other types of prior art shields include a radially-extending wall portion that is clamped or otherwise rigidly attached to the axle adjacent the outboard surface of the torque plate, and which extends radially past the outer edge or periphery of the rotor. The shield then bends at about a ninety-degree angle to form an axially-extending wall portion or lip that extends outboardly over a portion of the outer periphery of the rotor disc. However, due to the attachment of the shield adjacent the outboard surface of the torque plate, the shield is in extremely close proximity to the inboard surface and the outer periphery of the rotor. Such a close proximity, combined with an axially-extending wall, inhibits the escape of road spray and contaminants that pass by the shield, which in turn undesirably increases the exposure of the inboard surface of the rotor to road spray and contaminants.

As a result, there is a need in the art for a protection shield for a rotor of a disc brake for heavy-duty vehicles that provides direct protection against road spray and reduces the buildup of contaminants, thereby reducing corrosion of the inboard surface of the rotor and optimizing the performance and life of the rotor and corresponding brake pad(s). The rotor protection shield for heavy-duty vehicles of the present invention satisfies these needs, as will be described in detail below.

BRIEF SUMMARY OF THE INVENTION

An objective of the present invention is to provide a rotor protection shield for heavy-duty vehicles that provides direct protection of the rotor against road spray and contaminants.

Another objective of the present invention is to provide a rotor protection shield for heavy-duty vehicles that reduces the buildup of contaminants adjacent the rotor.

Yet another objective of the present invention is to provide a rotor protection shield for heavy-duty vehicles that reduces corrosion of the inboard surface of the rotor, thereby optimizing the performance and life of the rotor and corresponding brake pad(s).

These objectives and others are obtained by the rotor protection shield for heavy-duty vehicles of the present invention. In an exemplary embodiment of the invention, the shield includes a flat, radially-extending central wall and a sidewall. The sidewall is integrally fortified with and extends radially outwardly from an outer periphery of the central wall. The sidewall is angled axially outwardly relative to a planar surface of the central wall at an angle between about forty-five degrees and about seventy-five degrees. The shield is disposed proximate an inboard surface of the rotor to protect the rotor from road spray and contaminants.

BRIEF DESCRIPTION OF THE SEVERAL VIEWS OF THE DRAWINGS

The preferred embodiments of the present invention, illustrative of the best mode in which Applicant has contemplated applying the principles of the invention, are set forth in the following description and are shown in the drawings, and are particularly and distinctly pointed out and set forth in the claims.

Similar numerals refer to similar parts throughout the drawings.

DETAILED DESCRIPTION OF THE INVENTION

Figure 1:
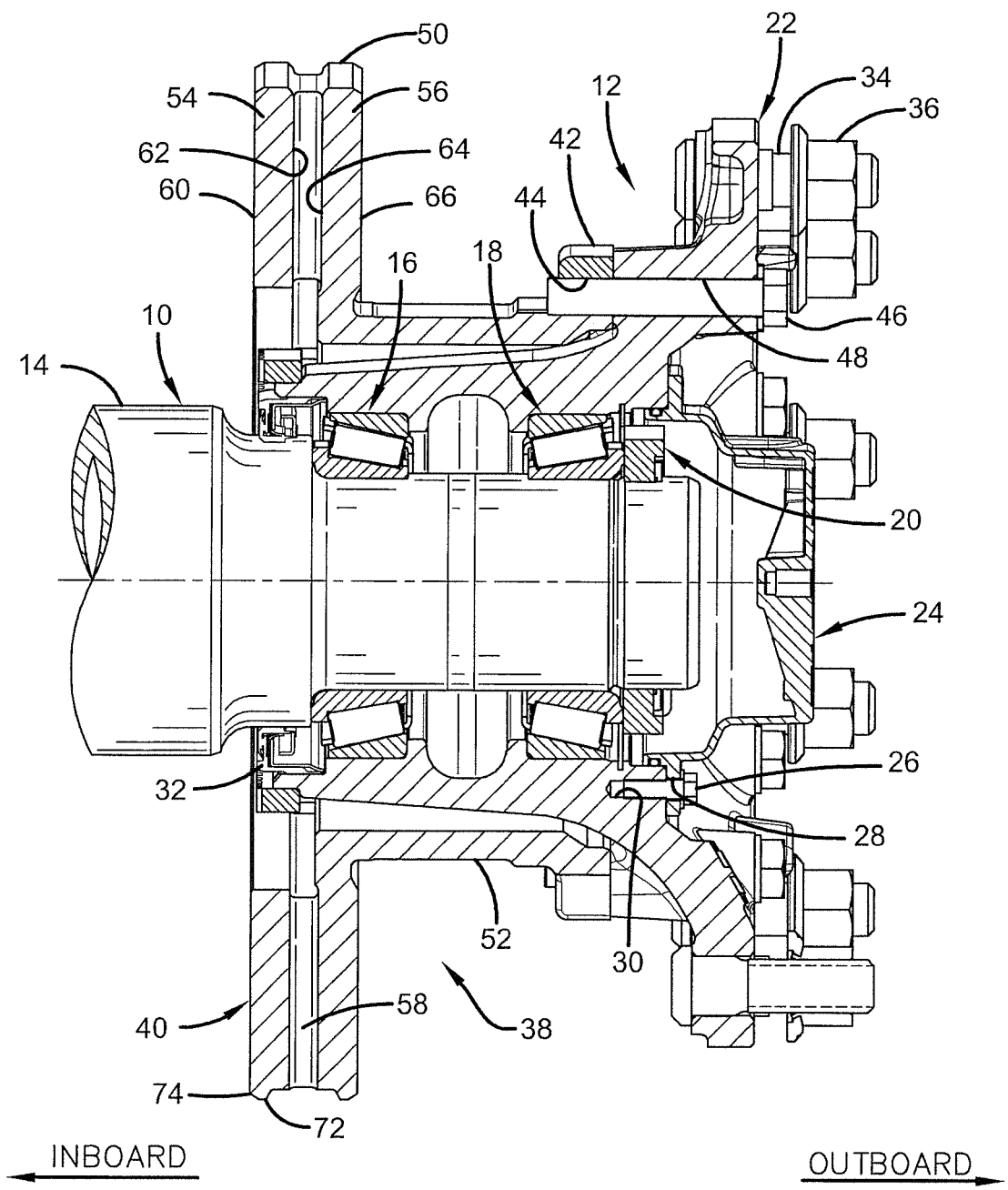
FIG. 1 is a fragmentary side elevational view, with hidden portions represented by dashed lines, shown partially in cross section, of a prior art disc brake rotor for heavy-duty vehicles, attached to a wheel end assembly that is mounted on an axle spindle.

In order to better understand the rotor protection shield for heavy-duty vehicles of the present invention and the environment in which it operates, an exemplary prior art rotor 40 of a disc brake assembly 38 for heavy-duty vehicles is shown in FIG. 1, and now will be described. The environment for rotor 40 includes one or more axles 10, which typically depend from and extend transversely across a heavy-duty vehicle (not shown). Heavy-duty vehicles include trucks and tractor-trailers or semi-trailers, and the tractor-trailers or semi-trailers typically are equipped with one or more trailers. Reference herein shall be made generally to a heavy-duty vehicle for the purpose of convenience, with the understanding that such reference includes trucks, tractor-trailers and semi-trailers, and trailers thereof. Each axle 10 has two ends, with a wheel end assembly 12 mounted on each one of the ends. For the purposes of convenience and clarity, only one end of axle 10 and its respective wheel end assembly 12 will be described herein.

Axle 10 includes a central tube 92 (FIG. 5), and an axle spindle 14 is integrally connected, by any suitable means such as welding, to each end of the central tube. Wheel end assembly 12 includes a bearing assembly having an inboard bearing 16 and an outboard bearing 18 immovably mounted on the outboard end of axle spindle 14. A spindle nut assembly 20 threadably engages the outboard end of axle spindle 14 and secures bearings 16, 18 in place. A wheel hub 22 is rotatably mounted on inboard and outboard bearings 16, 18 in a manner well known to those skilled in the art.

A hub cap 24 is mounted on the outboard end of hub 22 by a plurality of bolts 26, each one of which passes through a respective one of a plurality of openings 28 formed in the hub cap, and threadably engages a respective one of a plurality of aligned threaded openings 30 formed in the hub. In this manner, hub cap 24 closes the outboard end of wheel end assembly 12. A main continuous seal 32 is rotatably mounted on the inboard end of wheel end assembly 12 and closes the inboard end of the assembly. In a typical heavy-duty vehicle dual-wheel configuration, a plurality of threaded bolts 34 and mating nuts 36 are used to mount one tire rim or a pair of tire rims (not shown), depending on specific design considerations, on wheel end assembly 12. Each one of a pair of tires (not shown) is mounted on a respective one of the tire rims, as known in the art.

Rotor 40 includes a radially-extending mounting portion or flange 42, which is formed with openings 44 to receive mechanical fasteners 46, such as bolts. Hub 22 is formed with corresponding openings 48, thereby enabling bolts 46 to pass through aligned ones of the hub openings and rotor flange openings 44 to removably secure rotor 40 to the hub. This construction enables rotor 40 to rotate with hub 22, while being removable from the hub for servicing.

Rotor 40 also includes a radially-extending disc portion 50. Disc portion 50 is disposed between a pair of opposing brake pads (not shown) in a manner known in the art. An axially-extending rotor sleeve 52 is integrally formed with and extends between disc portion 50 and mounting flange 42. Sleeve 52 enables rotor disc portion 50 to be rigidly connected to mounting flange 42 and thus wheel end assembly 12.

Disc portion 50 of prior art rotor 40 includes an inboard disc 54 and an outboard disc 56, which are spaced apart from one another and are interconnected by a plurality of vanes 58. More particularly, inboard disc 54 includes an inboard surface 60 and an outboard surface 62, and outboard disc 56 includes an inboard surface 64 and an outboard surface 66. Inboard surface 60 of inboard disc 54 is located adjacent the friction material of a respective one of a pair of brake pads (not shown), and outboard surface 66 of outboard disc 56 is located adjacent the friction material of the other one of the pair of brake pads. Outboard surface 62 of inboard disc 54 and inboard surface 64 of outboard disc 56 face one another or are opposed, and vanes 58 are integrally formed with and extend between these surfaces.

A torque plate 80 (FIG. 5) is welded or otherwise rigidly attached to axle spindle 14, and a carrier 82 (FIG. 5) of disc brake assembly 38 is mechanically fastened to torque plate 80 by bolts 84 or other mechanical means. Carrier 82 supports a caliper 86, and the caliper is formed with a bore (not shown) for receiving one or more pistons (not shown) and an actuator 90. Actuator 90 typically is a brake air chamber, which is in fluid communication with a compressed air source (not shown) and activates movement of the piston(s). Caliper 86 also includes an outboard pad seat (not shown) that is disposed opposite the piston(s). Each one of a pair of opposing brake pads (not shown) includes friction material that is mounted on a backing plate (not shown), and is seated in carrier 82, with one of the pads being adjacent the piston(s) and the other pad being adjacent the outboard pad seat. Upon actuation by actuator 90, the piston(s) and the outboard pad seat cooperate to control movement of the brake pads.

As mentioned above, inboard surface 60 of inboard disc 54 is located adjacent the friction material of a respective one of a pair of the brake pads, and outboard surface 66 of outboard disc 56 is located adjacent the friction material of the other one of the pair of brake pads. During vehicle travel, when the vehicle brake system is engaged, compressed air flows to actuator 90, which engages movement of the piston(s) and the outboard pad seat. This movement in turn forces the friction material of each respective pad against a corresponding one of inboard surface 60 of inboard disc 54 and outboard surface 66 of outboard disc 56, slowing and/or stopping rotation of rotor 40, thereby slowing and/or stopping rotation of the vehicle wheel.

As described above, during operation of a heavy-duty vehicle, inboard surface 60 of inboard rotor disc 54, which shall be referred to herein for the purpose of convenience as the inboard surface of rotor 40, is particularly exposed to road spray and contaminants, and thus is susceptible to corrosion. When inboard surface 60 of rotor 40 corrodes, the corresponding brake pad wears prematurely from contact with the corroded surface, which reduces the performance and life of the rotor and at least the inboard brake pad.

To reduce the amount of road spray and contaminants that contact the inboard surface of the rotor, shields have been employed in the prior art. Such prior art shields (not shown) include designs with single radially-extending walls, which allow road spray and contaminants to work around the shield to inboard surface 60 of rotor 40; designs with a radially-extending wall and an axially-extending wall disposed radially outwardly of an outer periphery 72 of rotor 40, which include vent louvres and indentations that undesirably trap and hold contaminants; and designs with a radially-extending wall and an axially-extending wall disposed radially outwardly of outer periphery 72 in close proximity to inboard surface 60 and outer periphery 72 of rotor 40, which inhibits the escape of road spray and contaminants from the shield. These disadvantages undesirably allow inboard surface 60 of rotor 40 to be exposed to build-up of road spray and contaminants, leading to corrosion of the inboard surface the rotor and premature wear of the corresponding brake pad, which reduces the performance and life of the rotor and at least the inboard brake pad.

As a result, there is a need in the art for a protection shield for a rotor of a disc brake for heavy-duty vehicles that provides direct protection against road spray and reduces the buildup of contaminants, thereby reducing corrosion of the inboard surface of the rotor and optimizing the performance and life of the rotor and corresponding brake pad(s). The rotor protection shield for heavy-duty vehicles of the present invention satisfies these needs, as now will be described.

Figure 2:
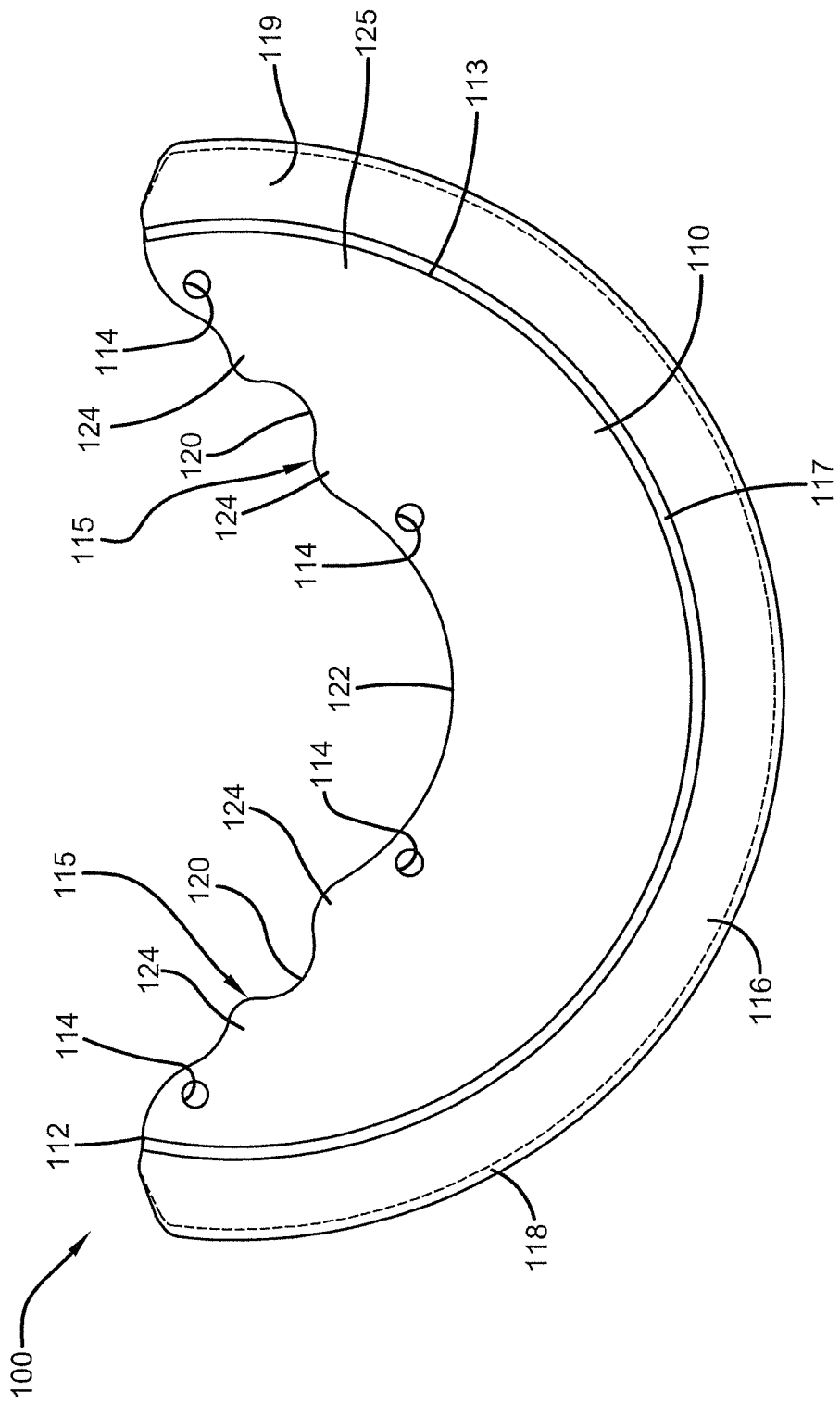
FIG. 2 is an inboard elevational view, with hidden portions represented by dashed lines, of a first exemplary embodiment rotor protection shield for heavy-duty vehicles of the present invention.
Figure 3:
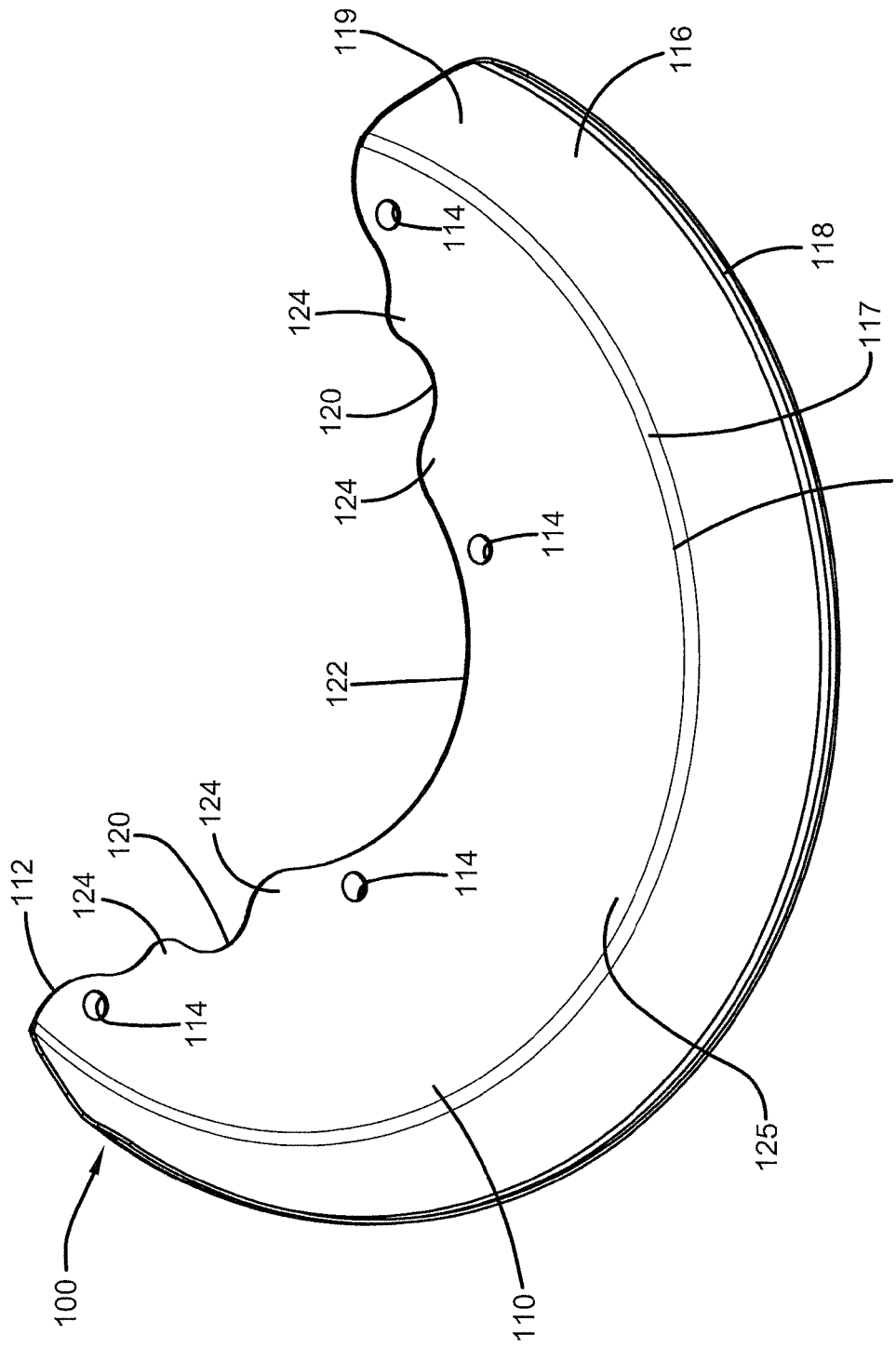
FIG. 3 is a perspective view of the rotor protection shield for heavy-duty vehicles shown in FIG. 2.
Figure 4:
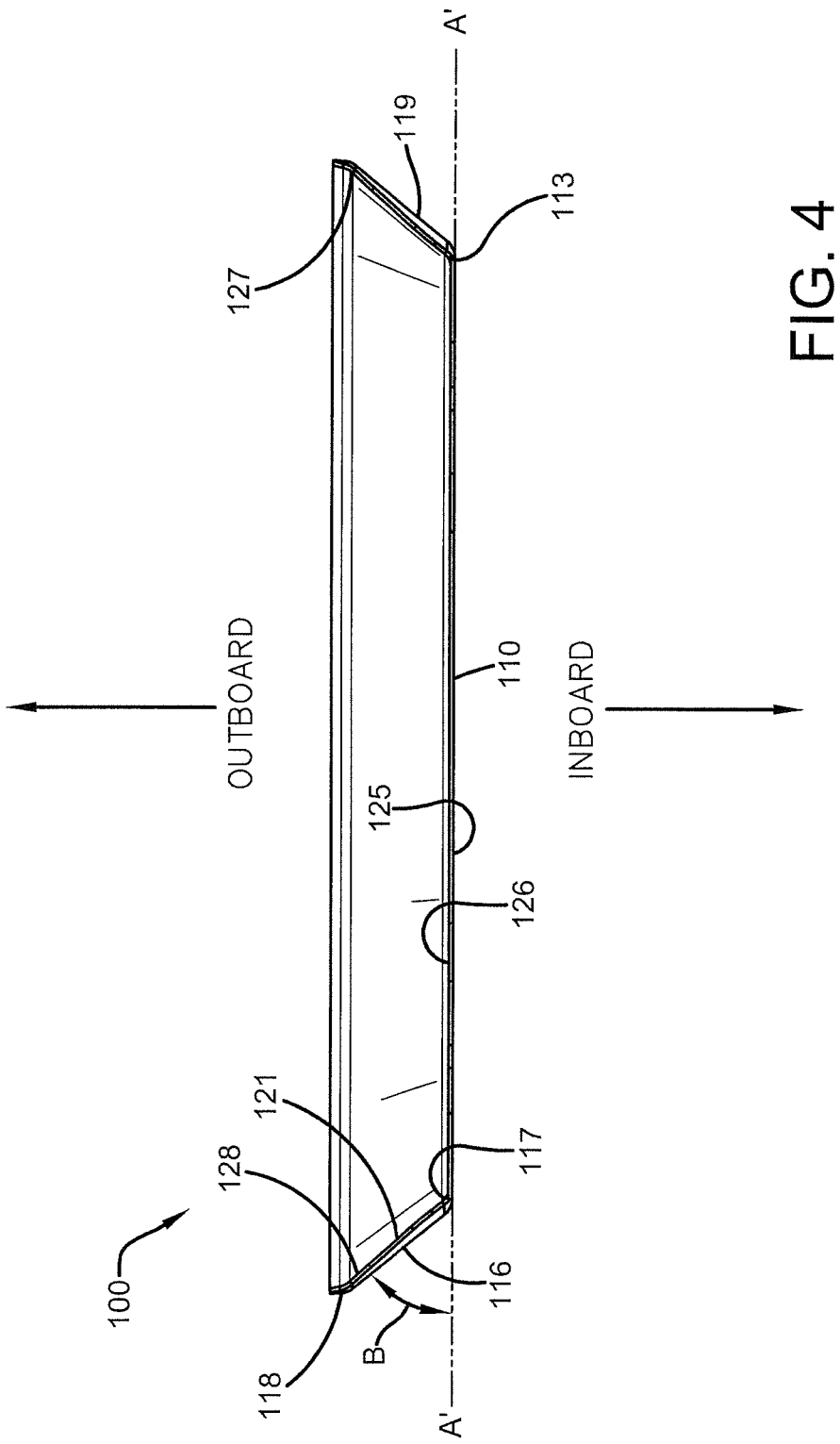
FIG. 4 is an end view, shown partially in cross section, of the rotor protection shield for heavy-duty vehicles shown in FIG. 2.

A first exemplary embodiment of the rotor protection shield for heavy-duty vehicles of the present invention is indicated generally at 100 and is shown in FIGS. 2-6. With reference to FIG. 2-4, first embodiment rotor shield 100 of the present invention includes a flat radially-extending central wall 110 that is generally crescent-shaped. Central wall 110 includes an inboard surface 125 and an outboard surface 126. Inboard surface 125 and outboard surface 126 each are smooth, being formed without axially-protruding surface features, such as vent louvers and/or indentations.

Central wall 110 is formed with a radially inner periphery 112 and a radially outer periphery 113. Inner periphery 112 is formed with a plurality of radially-extending contours or features 115. Features 115 preferably include alternating radially outward extending contours 124 and radially inward extending contours 120, which extend from a respective one of the intersections of inner periphery 112 and outer periphery 113 to a central concave axle feature 122.

Figure 5:
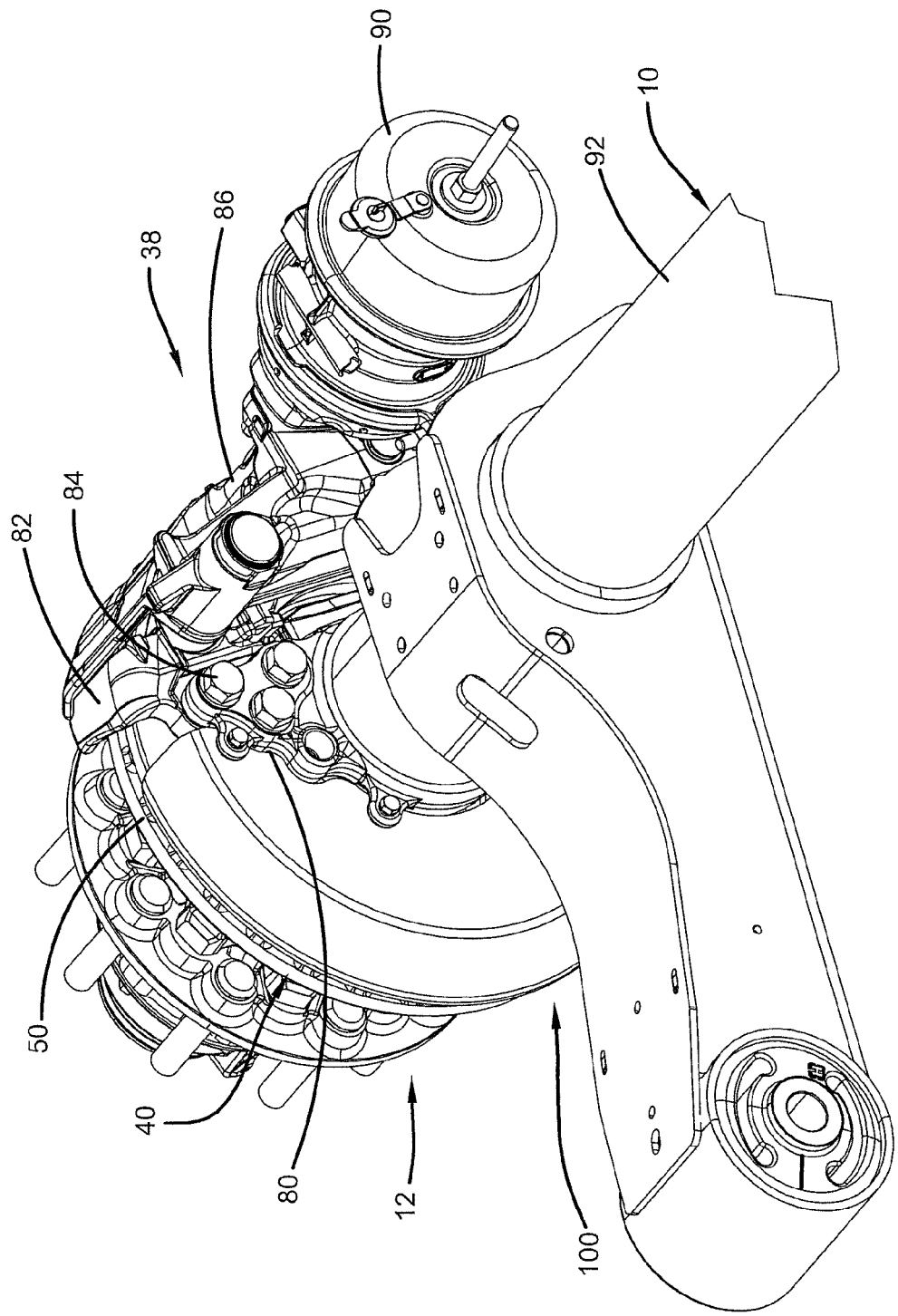
FIG. 5 is a perspective view of the rotor protection shield for heavy-duty vehicles shown in FIG. 2 and looking in an outboard direction, and shown installed on the driver side of an exemplary axle/suspension system, including some components of a disc brake assembly.
Figure 6:
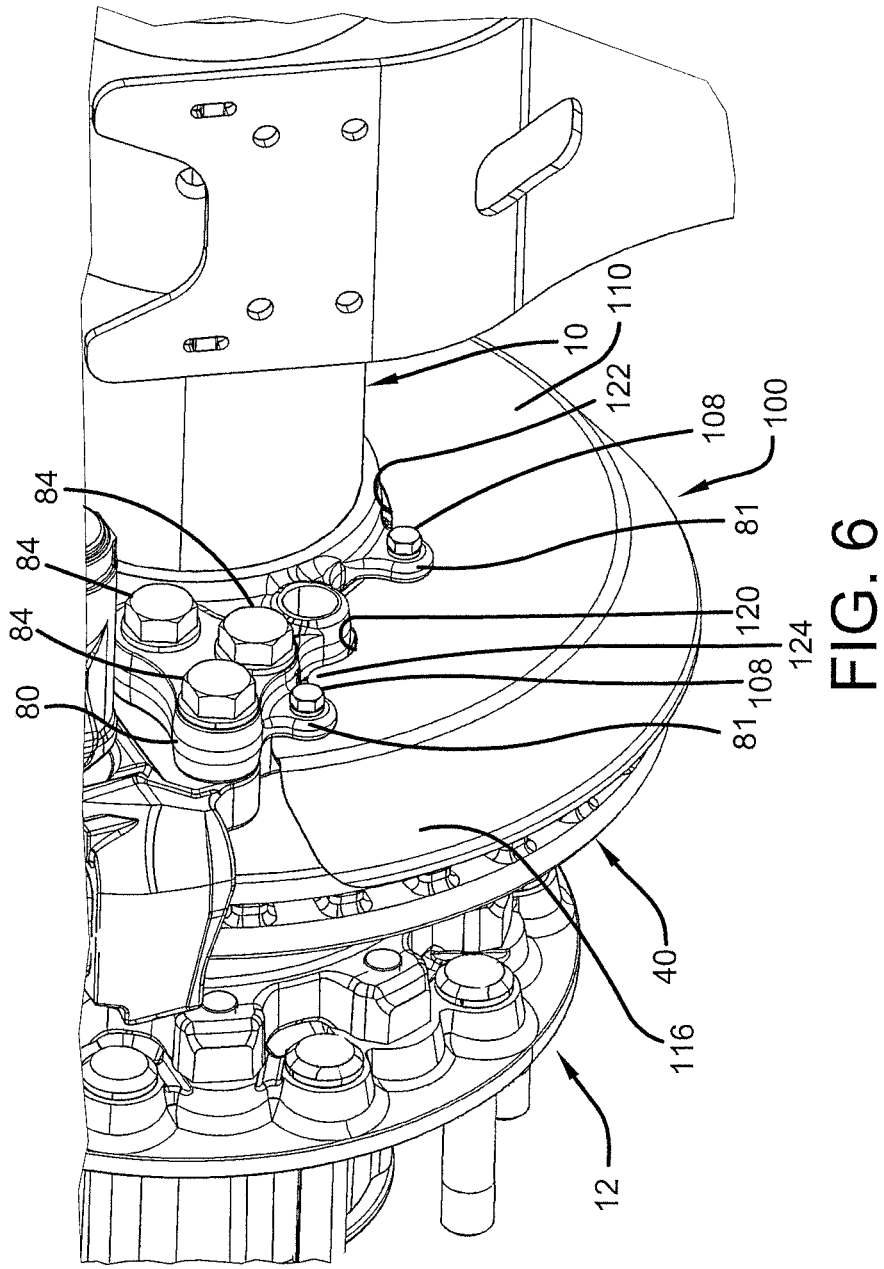
FIG. 6 is an enlarged fragmentary perspective view of the rotor protection shield, a portion of the axle/suspension system, and a portion of the disc brake assembly that are shown in FIG. 5.

As shown in FIGS. 5 and 6, axle feature 122 enables rotor shield 100 to tightly conform to the contour of the portion of torque plate 80 wrapping around axle 10 to minimize any space between the shield and the torque plate and axle to increase the protection of rotor 40 from road spray and contaminants. Likewise, contours 120 and 124 enable rotor shield 100 to tightly conform to the contour of torque plate 80 to minimize any space between the shield and the torque plate to increase the protection of rotor 40 from road spray and contaminants. It is to be understood that other shapes and configurations of contours or features 115 may be employed to accommodate particular contours of axle 10 and/or torque plate 80, without affecting the overall concept or operation of the invention.

Returning to FIGS. 2 and 3, central wall 110 is formed with a plurality of fastener openings 114 that are spaced apart proximate radially inner periphery 112. Preferably, central wall 110 is formed with four (4) fastener openings 114. Fastener openings 114 enable rotor shield 100 to be secured to torque plate 80 with mechanical fasteners 108 (FIG. 6). Preferably, torque plate 80 is formed with features such as projections 81 (FIG. 6) to enable rotor shield 100 to be mounted to the outboard surface of the torque plate, thereby disposing the rotor shield in close proximity to inboard surface 60 (FIG. 1) of rotor 40, as will be described in greater detail below. Such mounting minimizes the space between rotor shield 100 and rotor 40 to increase the protection of the rotor from road spray and contaminants.

With reference now to FIGS. 2-4, an angled sidewall 116 is integrally formed with and extends radially outwardly from outer periphery 113 of central wall 110. More particularly, rotor shield 100 is formed with a first bend 117, which provides a smooth-surface transition from central wall 110 to sidewall 116. Sidewall 116 extends radially outwardly past outer periphery 72 of rotor 40 (FIG. 1), thereby protecting the entire inboard surface 60 of the rotor. Sidewall 116 includes an inboard surface 119 and an outboard surface 121, which are both smooth, being formed without axially-protruding surface features, such as vent louvers and/or indentations.

Sidewall 116 is angled axially outboardly relative to a planar surface A' of central wall 110 at an angle indicated by B. More particularly, sidewall 116 extends radially outwardly and axially outboardly relative to planar surface A' of central wall at angle B, which is between about forty-five (45) degrees and about seventy-five (75) degrees. Preferably, angle B is between about fifty (50) degrees and about sixty (60) degrees, and most preferably for first embodiment rotor shield 100, angle B is about fifty-one (51) degrees. In order to accommodate rotors 40 of different diameters, angle B may be adjusted accordingly. For example, for a rotor of a larger diameter, angle B may be close to about forty-five (45) degrees, while for a rotor of a smaller diameter, angle B may be close to about seventy-five (75) degrees. In this manner, rotor shield 100 of the invention can be adapted to provide protection to the entire inboard surface 60 of rotor 40.

Preferably, angle B of sidewall 116 enables rotor shield 100 to be disposed in optimum proximity to an inboard corner 74 (FIG. 1) of outer periphery 72 of rotor 40. Sidewall 116 is close enough to inboard rotor corner 74 to keep contaminants away from rotor 40, while being far enough away to enable the egress of road spray and contaminants from the space between rotor inboard surface 60 and rotor shield 100. For example, sidewall 116 preferably provides from about three-eighths to about one-half of one inch of space from inboard rotor corner 74. In addition, angled sidewall 116 enables central wall 110 to be positioned further away from inboard surface 60 of rotor 40, such as at least about one inch away, to facilitate dissipation of heat from the rotor. In this manner, sidewall 116 and central wall 110 of rotor shield 100 provide optimum positioning of the rotor shield relative to rotor 40.

An optional feature of rotor shield 100 is a lip 118. Lip 118 is integrally formed with and extends radially outwardly and axially outboardly from a radially outer periphery 128 of sidewall 116. More particularly, rotor shield 100 is formed with a second bend 127, which provides a smooth-surface transition from sidewall 116 to lip 118. Lip 118 extends axially outboardly generally perpendicular to planar surface A' of central wall 110 for a distance of about one-eighth (0.125) of an inch. Lip 118 enables efficient forming of sidewall 116 integrally with central wall 110.

The structure of protection shield 100 of the present invention is thus optimized for flow to enable road spray and contaminants to be expelled from the shield. For example, the structure of central wall 110 and sidewall 116 of rotor shield 100 enables the shield to be located proximate inboard surface 60 of rotor 40 and to extend past outer periphery 72 of the rotor, which provides optimum direct protection from road spray and contaminants. In addition, the structure of flat central wall 110 and sidewall 116, which is smoothly angled between about 45 degrees to about 70 degrees relative to the central wall, enable such close proximity to rotor 40 while urging road spray and contaminants to flow off of and away from the wall surfaces without creating areas for buildup of contaminants. Moreover, because central wall 110 and sidewall 116 are smooth and lack surface features, such as louvres or indentations, road spray and contaminants are urged off of and away from shield with minimal buildup of contaminants on the surfaces of rotor shield 100. In this manner, rotor protection shield 100 of the present invention provides direct protection against road spray and contaminants and reduces the buildup of contaminants, thereby reducing corrosion of inboard surface 60 of rotor 40 and optimizing the performance and life of the rotor and corresponding brake pad(s).

Figure 7:
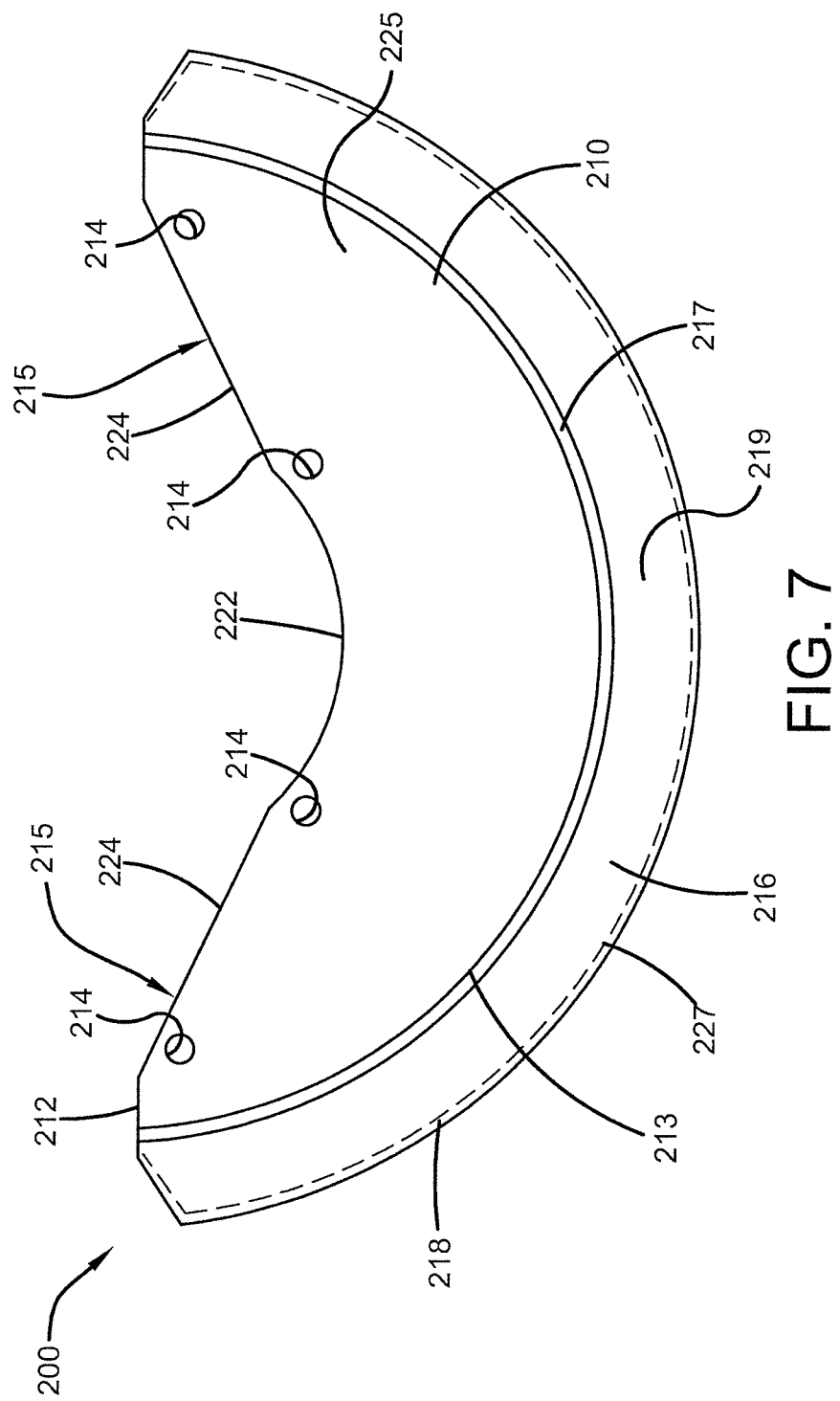
FIG. 7 is an inboard elevational view, with hidden portions represented by dashed lines, of a second exemplary embodiment rotor protection shield for heavy-duty vehicles of the present invention.
Figure 8:
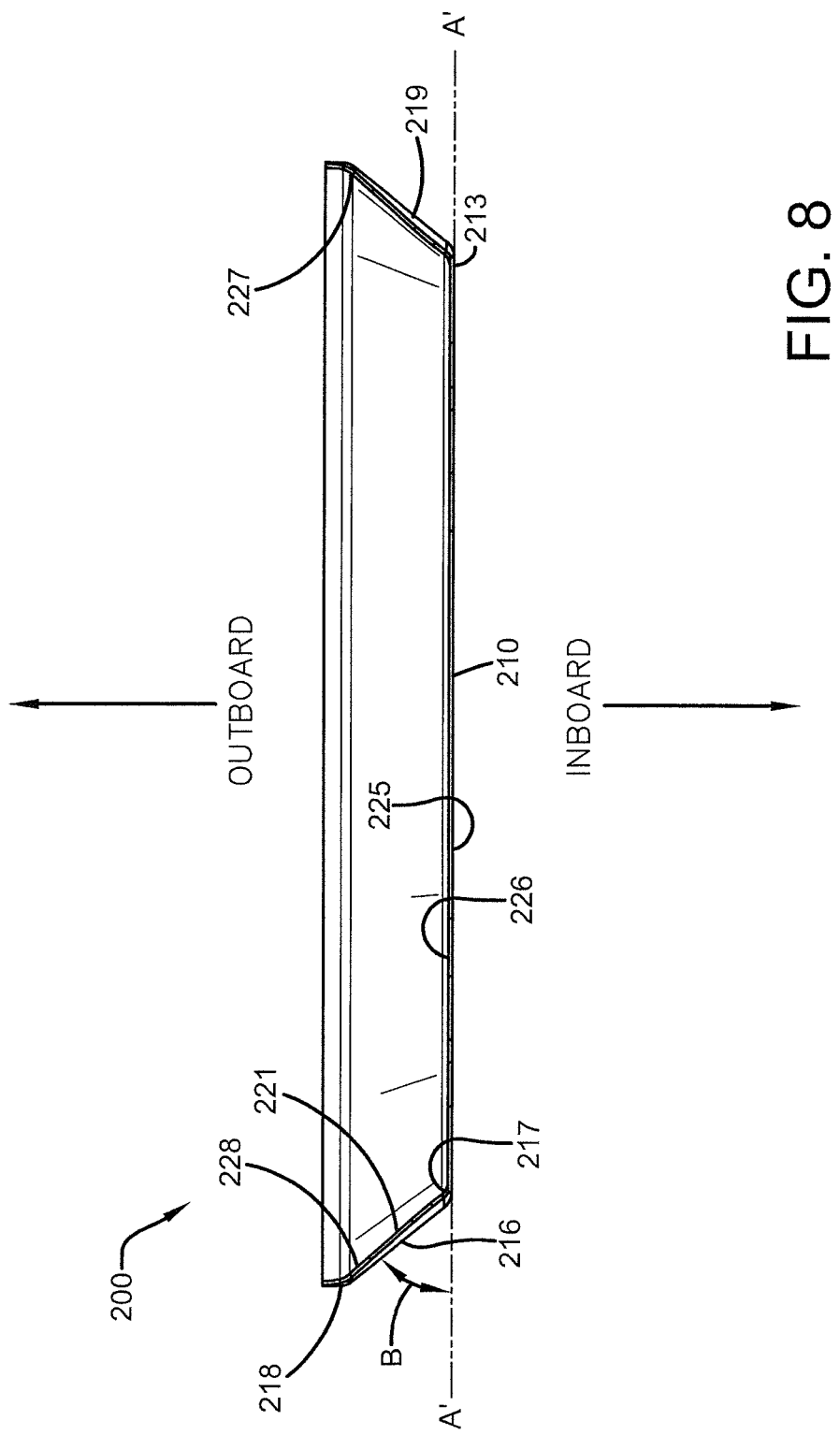
FIG. 8 is an end view, shown partially in cross section, of the rotor protection shield for heavy-duty vehicles shown in FIG. 7.

A second exemplary embodiment of the rotor protection shield for heavy-duty vehicles of the present invention is indicated generally at 200 and is shown in FIGS. 7 and 8. Second embodiment rotor shield 200 is generally similar in structure and operation to first embodiment rotor shield 100, with the exception that the second embodiment rotor shield employs fewer inner periphery features 215 when compared to features 115 (FIG. 2) of the first embodiment rotor shield. By employing fewer features 215, second embodiment rotor shield 200 can be installed on a torque plate (not shown) having a different shape and/or configuration than torque plate 80 (FIG. 5) associated with first embodiment rotor shield 100.

Second embodiment rotor shield 200 of the present invention includes a flat radially-extending central wall 210 that is generally crescent-shaped. Central wall 210 includes an inboard surface 225 and an outboard surface 226. Inboard surface 225 and outboard surface 226 each are smooth, being formed without axially-protruding surface features, such as vent louvers and/or indentations. Central wall 210 is formed with a radially inner periphery 212 and a radially outer periphery 213.

As described above, inner periphery 212 is formed with radially-extending contours or features 215. More particularly, features 215 preferably include a pair of compound angular segments 224, each one of which extends from a respective one of the intersections of inner periphery 212 and outer periphery 213 to a central concave axle feature 222. Axle feature 222 enables rotor shield 200 to tightly conform to the contour of the portion of torque plate 80 wrapping around axle 10 (FIG. 5) to minimize any space between the shield and the torque plate and axle to increase the protection of rotor 40 from road spray and contaminants. Likewise, compound angular segments 224 enable rotor shield 200 to tightly conform to the contour of the torque plate (not shown) to minimize any space between the shield and the torque plate to increase the protection of rotor 40 from road spray and contaminants. It is to be understood that other shapes and configurations of contours or features 215 may be employed to accommodate particular contours of axle 10 and/or a torque plate, without affecting the overall concept or operation of the invention.

Central wall 210 is formed with a plurality of fastener openings 214 that are spaced apart proximate radially inner periphery 212. Preferably, central wall 210 is formed with four (4) fastener openings 214. Fastener openings 214 enable rotor shield 200 to be secured to a torque plate with mechanical fasteners 108 (FIG. 6). Preferably, rotor shield 200 is mounted to the outboard surface of the torque plate to enable the rotor shield to be disposed in close proximity to inboard surface 60 (FIG. 1) of rotor 40, as will be described in greater detail below. Such mounting minimizes the space between rotor shield 200 and rotor 40 to increase the protection of the rotor from road spray and contaminants.

An angled sidewall 216 is integrally formed with and extends radially outwardly from outer periphery 213 of central wall 210. More particularly, rotor shield 200 is formed with a first bend 217, which provides a smooth-surface transition from central wall 210 to sidewall 216. Sidewall 216 extends radially outwardly past outer periphery 72 of rotor 40 (FIG. 1), thereby protecting the entire inboard surface 60 of the rotor. Sidewall 216 includes an inboard surface 219 and an outboard surface 221, which are both smooth, being formed without axially-protruding surface features, such as vent louvers and/or indentations.

Sidewall 216 is angled axially outboardly relative to a planar surface A' of central wall 210 at an angle indicated by B. More particularly, sidewall 216 extends radially outwardly and axially outboardly relative to planar surface A' of central wall at angle B, which is between about forty-five (45) degrees and about seventy-five (75) degrees. Preferably, angle B is between about fifty (50) degrees and about sixty (60) degrees, and most preferably for second embodiment rotor shield 200, angle B is about fifty-one (51) degrees. In order to accommodate rotors 40 of different diameters, angle B may be adjusted accordingly. For example, for a rotor of a larger diameter, angle B may be close to about forty-five (45) degrees, while for a rotor of a smaller diameter, angle B may be close to about seventy-five (75) degrees. In this manner, rotor shield 200 of the invention can be adapted to provide protection to the entire inboard surface 60 of rotor 40.

Preferably, angle B of sidewall 216 enables rotor shield 200 to be disposed in optimum proximity to an inboard corner 74 (FIG. 1) of outer periphery 72 of rotor 40. Sidewall 216 is close enough to inboard rotor corner 74 to keep contaminants away from rotor 40, while being far enough away to enable the egress of road spray and contaminants from the space between rotor inboard surface 60 and rotor shield 200. For example, sidewall 216 preferably provides from about three-eighths to about one-half of one inch of space from inboard rotor corner 74. In addition, angled sidewall 216 enables central wall 210 to be positioned further away from inboard surface 60 of rotor 40, such as at least about one inch away, to facilitate dissipation of heat from the rotor. In this manner, sidewall 216 and central wall 210 of rotor shield 200 provide optimum positioning of the rotor shield relative to rotor 40.

An optional feature of rotor shield 200 is a lip 218. Lip 218 is integrally formed with and extends radially outwardly and axially outboardly from a radially outer periphery 228 of sidewall 216. More particularly, rotor shield 200 is formed with a second bend 227, which provides a smooth-surface transition from sidewall 216 to lip 218. Lip 218 extends axially outboardly generally perpendicular to planar surface A' of central wall 210 for a distance of about one-eighth (0.125) of an inch. Lip 218 enables efficient forming of sidewall 216 integrally with central wall 210.

The structure of protection shield 200 of the present invention is thus optimized for flow to enable road spray and contaminants to be expelled from the shield. For example, the structure of central wall 210 and sidewall 216 of rotor shield 200 enables the shield to be located proximate inboard surface 60 of rotor 40 and to extend past outer periphery 72 of the rotor, which provides optimum direct protection from road spray and contaminants. In addition, the structure of flat central wall 210 and sidewall 216, which is smoothly angled between about 45 degrees to about 70 degrees relative to the central wall, enable such close proximity to rotor 40 while urging road spray and contaminants to flow off of and away from the wall surfaces without creating areas for buildup of contaminants. Moreover, because central wall 210 and sidewall 216 are smooth and lack surface features, such as louvres or indentations, road spray and contaminants are urged off of and away from shield with minimal buildup of contaminants on the surfaces of rotor shield 200. In this manner, second embodiment rotor protection shield 200 of the present invention provides direct protection against road spray and contaminants and reduces the buildup of contaminants, thereby reducing corrosion of inboard surface 60 of rotor 40 and optimizing the performance and life of the rotor and corresponding brake pad(s).

Figure 9:
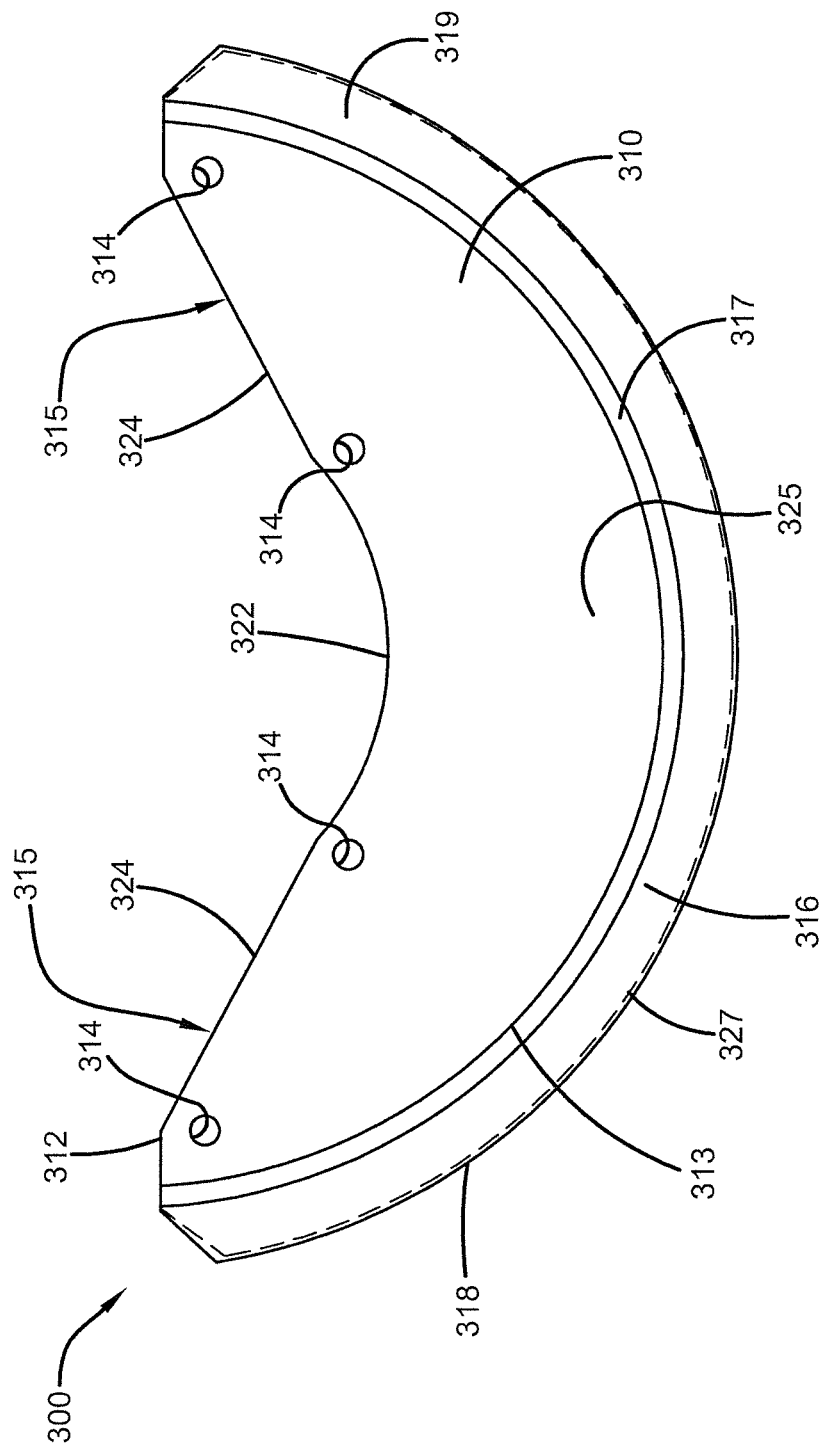
FIG. 9 is an inboard elevational view, with hidden portions represented by dashed lines, of a third exemplary embodiment rotor protection shield for heavy-duty vehicles of the present invention.
Figure 10:
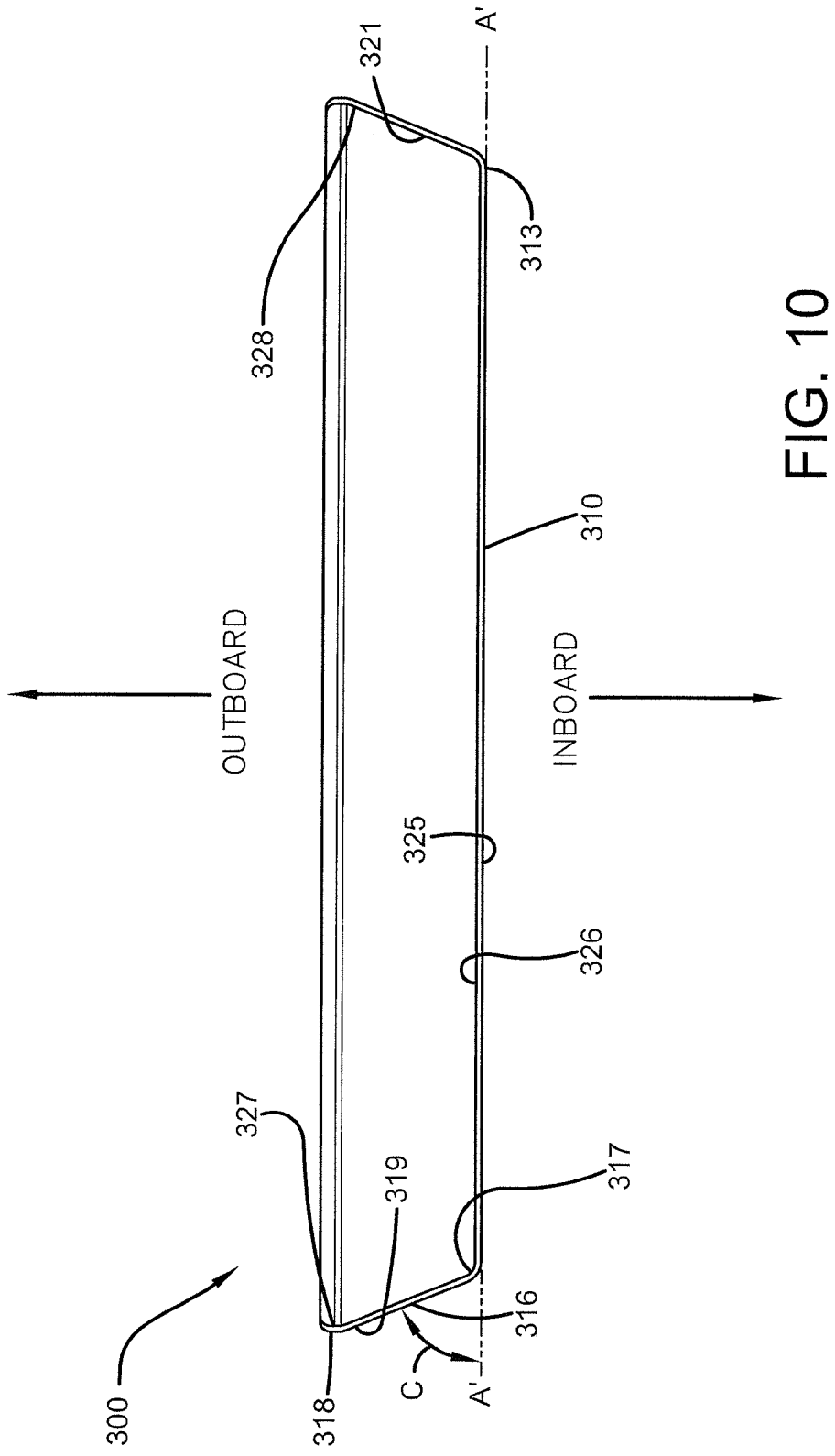
FIG. 10 is an end view, shown partially in cross section, of the rotor protection shield for heavy-duty vehicles shown in FIG. 9.

A third exemplary embodiment of the rotor protection shield for heavy-duty vehicles of the present invention is indicated generally at 300 and is shown in FIGS. 9 and 10. Third embodiment rotor shield 300 is generally similar in structure and operation to second embodiment rotor shield 200, with the exception that the third embodiment rotor shield employs a different angle of sidewall 316 relative to central wall 310 when compared to angle B of sidewall 216 relative to central wall 210 of the second embodiment rotor shield. By employing a different angle, third embodiment rotor shield 300 can be employed in conjunction with a rotor having a different diameter than rotor 40 (FIG. 5) associated with second embodiment rotor shield 200.

Third embodiment rotor shield 300 of the present invention includes a flat radially-extending central wall 310 that is generally crescent-shaped. Central wall 310 includes an inboard surface 325 and an outboard surface 326. Inboard surface 325 and outboard surface 326 each are smooth, being formed without axially-protruding surface features, such as vent louvers and/or indentations. Central wall 310 is formed with a radially inner periphery 312 and a radially outer periphery 313.

As described above, inner periphery 312 is formed with radially-extending contours or features 315. More particularly, features 315 preferably include a pair of compound angular segments 324, each one of which extends from a respective one of the intersections of inner periphery 312 and outer periphery 313 to a central concave axle feature 322. Axle feature 322 enables rotor shield 300 to tightly conform to the contour of the portion of torque plate 80 wrapping around axle 10 (FIG. 5) to minimize any space between the shield and the torque plate and axle to increase the protection of rotor 40 from road spray and contaminants. Likewise, compound angular segments 324 enable rotor shield 300 to tightly conform to the contour of the torque plate (not shown) to minimize any space between the shield and the torque plate to increase the protection of the rotor from road spray and contaminants. It is to be understood that other shapes and configurations of contours or features 315 may be employed to accommodate particular contours of axle 10 and/or a torque plate, without affecting the overall concept or operation of the invention.

Central wall 310 is formed with a plurality of fastener openings 314 that are spaced apart proximate radially inner periphery 312. Preferably, central wall 310 is formed with four (4) fastener openings 314. Fastener openings 314 enable rotor shield 300 to be secured to a torque plate with mechanical fasteners 108 (FIG. 6). Preferably, rotor shield 300 is mounted to the outboard surface of the torque plate to enable the rotor shield to be disposed in close proximity to the inboard surface of the rotor, as will be described in greater detail below. Such mounting minimizes the space between rotor shield 300 and rotor 40 to increase the protection of the rotor from road spray and contaminants.

An angled sidewall 316 is integrally formed with and extends radially outwardly from outer periphery 313 of central wall 310. More particularly, rotor shield 300 is formed with a first bend 317, which provides a smooth-surface transition from central wall 310 to sidewall 316. Sidewall 316 extends radially outwardly past outer periphery 72 of the rotor, thereby protecting the entire inboard surface of the rotor. Sidewall 316 includes an inboard surface 319 and an outboard surface 321, which are both smooth, being formed without axially-protruding surface features, such as vent louvers and/or indentations.

Sidewall 316 is angled axially outboardly relative to a planar surface A' of central wall 310 at an angle indicated by C. More particularly, sidewall 316 extends radially outwardly and axially outboardly relative to planar surface A' of central wall 310 at angle C, which is between about forty-five (45) degrees and about seventy-five (75) degrees. Preferably for third embodiment rotor shield 300, angle C is about sixty-eight (68) degrees. In order to accommodate rotors of different diameters, angle C may be adjusted accordingly. For example, for a rotor of a larger diameter, angle C may be close to about forty-five (45) degrees, while for a rotor of a smaller diameter, angle C may be close to about seventy-five (75) degrees. In this manner, rotor shield 300 of the invention can be adapted to provide protection to the entire inboard surface of the rotor.

Preferably, angle C of sidewall 316 enables rotor shield 300 to be disposed in optimum proximity to an inboard corner of the outer periphery of the rotor. Sidewall 316 is close enough to the inboard rotor corner to keep contaminants away from the rotor, while being far enough away to enable the egress of road spray and contaminants from the space between the rotor inboard surface and rotor shield 300. For example, sidewall 316 preferably provides from about three-eighths to about one-half of one inch of space from the inboard rotor corner. In addition, angled sidewall 316 enables central wall 310 to be positioned further away from the inboard surface of the rotor, such as at least about one inch away, to facilitate dissipation of heat from the rotor. In this manner, sidewall 316 and central wall 310 of rotor shield 300 provide optimum positioning of the rotor shield relative to the rotor.

An optional feature of rotor shield 300 is a lip 318. Lip 318 is integrally formed with and extends radially outwardly and axially outboardly from a radially outer periphery 328 of sidewall 316. More particularly, rotor shield 300 is formed with a second bend 327, which provides a smooth-surface transition from sidewall 316 to lip 318. Lip 318 extends axially outboardly generally perpendicular to planar surface A' of central wall 310 for a distance of about one-eighth (0.125) of an inch. Lip 318 enables efficient forming of sidewall 316 integrally with central wall 310.

The structure of protection shield 300 of the present invention is thus optimized for flow to enable road spray and contaminants to be expelled from the shield. For example, the structure of central wall 310 and sidewall 316 of rotor shield 300 enables the shield to be located proximate the inboard surface of the rotor and to extend past the outer periphery of the rotor, which provides optimum direct protection from road spray and contaminants. In addition, the structure of flat central wall 310 and sidewall 316, which is smoothly angled between about 45 degrees to about 70 degrees relative to the central wall, enable such close proximity to the rotor while urging road spray and contaminants to flow off of and away from the wall surfaces without creating areas for buildup of contaminants. Moreover, because central wall 310 and sidewall 316 are smooth and lack surface features, such as louvres or indentations, road spray and contaminants are urged off of and away from shield with minimal buildup of contaminants on the surfaces of rotor shield 300. In this manner, third embodiment rotor protection shield 300 of the present invention provides direct protection against road spray and contaminants and reduces the buildup of contaminants, thereby reducing corrosion of the inboard surface of the rotor and optimizing the performance and life of the rotor and corresponding brake pad(s).

Rotor protection shield 100, 200, 300 for heavy-duty vehicles of the present invention thus provides direct protection against road spray and contaminants and reduces the buildup of contaminants. Such protection and reduction of contaminant buildup reduces corrosion of inboard surface 60 of rotor 40, desirably optimizing the performance and life of the rotor and corresponding brake pad(s).

Rotor protection shield 100, 200, 300 for heavy-duty vehicles of the present invention also desirably blocks cold water from directly contacting inboard surface 60 of rotor 40. More particularly, when a heavy-duty vehicle travels over roads, cold water may be caused to move upward from the road surface by the vehicle tires toward the underside of the vehicle. Without rotor protection shield 100, 200, 300, such cold water may contact inboard surface 60 of rotor 40. Because rotor 40 is often hot due to the heat generated from the friction of the brake pads contacting the rotor due to braking, the contact of cold water with rotor inboard surface 60 may cause thermal cracking of the rotor, particularly when the rotor is formed of grey iron. Such thermal cracking may undesirably decrease the performance and/or shorten the life of rotor 40. The structure and positioning of rotor protection shield 100, 200, 300 prevents cold water from directly contacting inboard surface 60 of rotor 40, thereby reducing the likelihood of thermal cracking of the rotor, which in turn increases the performance and life of the rotor. Rotor protection shield 100, 200, 300 for heavy-duty vehicles of the present invention preferably is formed of a material that is readily formed by stamping or molding, such as aluminum, steel, alloys thereof, rigid polymers, composites, and the like.

An optional feature of rotor protection shield 100, 200, 300 for heavy-duty vehicles of the present invention is coating of the shield with a protective or friction-reducing coating. For example, rotor protection shield 100, 200, 300 may be electro-coated or e-coated. In e-coating, an epoxy-based or acrylic-based coating is deposited onto rotor protection shield 100, 200, 300 and an electric current is introduced to promote a surface reaction on the shield, which enables optimum depositing of the coating. This optimum depositing of the epoxy-based or acrylic-based coating keeps rotor protection shield 100, 200, 300 smooth and provides resistance to the formation of corrosion cells on the shield. While the entire surface of rotor protection shield 100, 200, 300 may be coated, to reduce the cost associated with such coating, preferably each respective rotor shield outboard surface 121, 126, 221, 226, 321, 326, which faces inboard surface 60 of rotor 40, is coated. It is to be understood that other types of coating of rotor protection shield 100, 200, 300, such as dipping, spraying, or particle deposition techniques known to those skilled in the art may be employed without affecting the overall concept or operation of the invention. Such coating of rotor protection shield 100, 200, 300 increases the ability of the shield to urge road spray and contaminants off of and away from the shield, while also reducing potential corrosion of the shield.

The present invention also includes a method of reducing the exposure of brake rotor 40 to road spray and contaminants using rotor protection shield 100, 200, 300 for heavy-duty vehicles. The method includes steps in accordance with the description that is presented above and shown in FIGS. 2-10.

It is to be understood that the structure and arrangement of the above-described rotor protection shield 100, 200, 300 for heavy-duty vehicles of the present invention may be altered or rearranged without affecting the overall concept or operation of the invention. In addition, the rotor protection shield 100, 200, 300, for heavy-duty vehicles of the present invention may be employed with other types of axles, wheel end assemblies, axle/suspension systems, and/or brake systems and assemblies than those shown and described above, without affecting the overall concept or operation of the invention. Moreover, while reference herein has been made generally to a heavy-duty vehicle for the purpose of convenience, it has been with the understanding that such reference includes trucks, tractor-trailers and semi-trailers, and trailers thereof.

Accordingly, the rotor protection shield for heavy-duty vehicles of the present invention is simplified, provides an effective, safe, inexpensive, and efficient structure which achieves all the enumerated objectives, provides for eliminating difficulties encountered with prior art rotor shields, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to specific embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the rotor protection shield for heavy-duty vehicles of the present invention is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A rotor protection shield for heavy-duty vehicles, said shield comprising:
a flat, radially-extending central wall; and
a sidewall integrally formed with and extending radially outwardly from an outer periphery of said central wall, said sidewall extending axially outboardly from and non-perpendicular to a planar surface of the central wall, whereby said shield is disposed proximate an inboard surface of said rotor to protect the rotor from road spray and contaminants, said central wall and said sidewall being free of surface features.

2. The rotor protection shield for heavy-duty vehicles of claim 1, wherein said sidewall covers a radially outward edge of said rotor.

3. The rotor protection shield for heavy-duty vehicles of claim 2, wherein said sidewall is from three-eighths to one-half of one inch from an inboard corner of said radially outward edge of said rotor.

4. The rotor protection shield for heavy-duty vehicles of claim 1, wherein said central wall is formed with a radially outer periphery and a radially inner periphery, and said radially inner periphery is formed with a plurality of radially-extending features.

5. The rotor protection shield for heavy-duty vehicles of claim 4, wherein said features include alternating radially outward contours and radially inward contours.

6. The rotor protection shield for heavy-duty vehicles of claim 4, wherein said features include a pair of compound angular segments.

7. The rotor protection shield for heavy-duty vehicles of claim 4, wherein said features include a central concave axle feature.

8. The rotor protection shield for heavy-duty vehicles of claim 1, wherein said central wall is formed with a plurality of fastener openings, said openings being spaced apart proximate a radially inner periphery of the central wall for receiving fasteners to mount said shield to a torque plate.

9. The rotor protection shield for heavy-duty vehicles of claim 8, wherein said plurality of fastener openings includes four openings.

10. The rotor protection shield for heavy-duty vehicles of claim 1, wherein said sidewall extends axially outboardly from said planar surface of said central wall at an angle from fifty to sixty degrees.

11. The rotor protection shield for heavy-duty vehicles of claim 10, wherein said angle of said sidewall to said planar surface of said central wall is fifty-one degrees.

12. The rotor protection shield for heavy-duty vehicles of claim 1, wherein said angle of said sidewall to said planar surface of said central wall is sixty-eight degrees.

13. The rotor protection shield for heavy-duty vehicles of claim 1, further comprising a lip being integrally formed with and extending from a radially outer periphery of said sidewall.

14. The rotor protection shield for heavy-duty vehicles of claim 1, wherein said lip extends axially outboardly generally perpendicular to said planar surface of said central wall.

15. The rotor protection shield for heavy-duty vehicles of claim 14, wherein said lip extends axially outboardly for a distance of one-eighth of an inch.

16. The rotor protection shield for heavy-duty vehicles of claim 1, further comprising a coating formed on said shield.

17. The rotor protection shield for heavy-duty vehicles of claim 16, wherein said coating is formed on an outboard surface of said shield.

18. The rotor protection shield for heavy-duty vehicles of claim 16, wherein said coating includes e-coating.

19. The rotor protection shield for heavy-duty vehicles of claim 1, wherein said sidewall extends axially outboardly from said planar surface of said central wall at an angle from forty-five degrees to seventy-five degrees.

* * * * *